Dec. 24, 1935.   R. L. DURHAM   2,025,159
RESILIENT TIRE
Filed Sept. 14, 1935
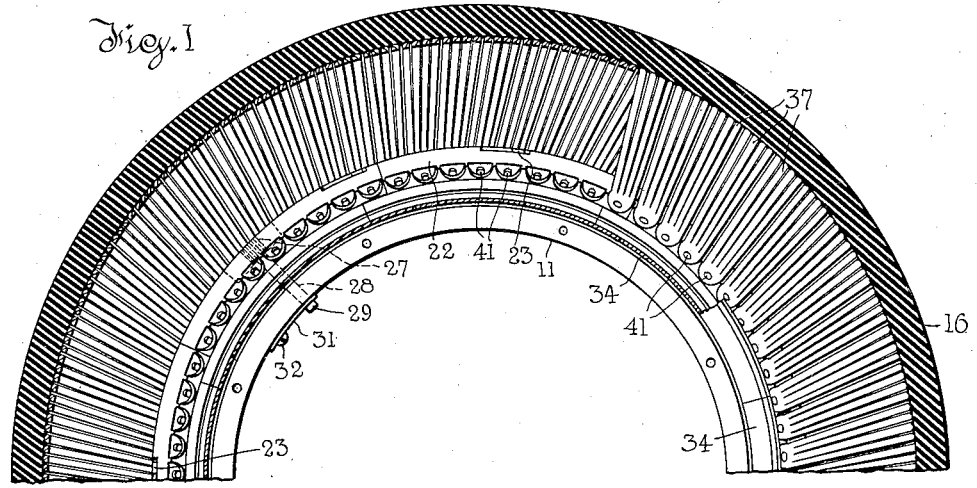
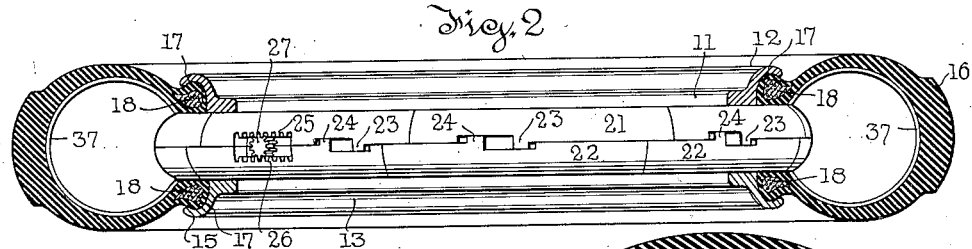
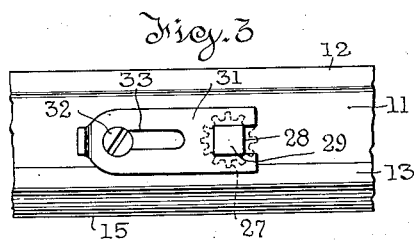
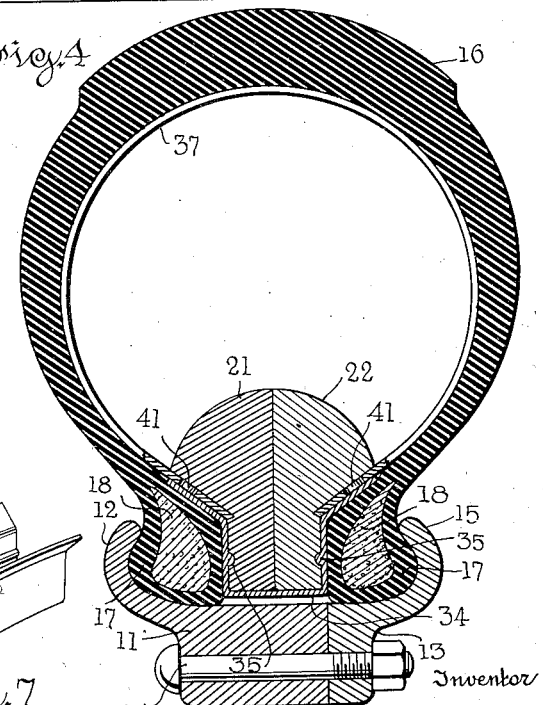
Inventor
Robert Lee Durham
By *Dodge* Attorneys Patented Dec. 24, 1935

2,025,159

UNITED STATES PATENT OFFICE 2,025,159

RESILIENT TIRE

Robert Lee Durham, Buena Vista, Va.

Application September 14, 1935, Serial No. 40,652

7 Claims. (Cl. 152—8)

This invention relates to resilient tires, and particularly to a metallic spring structure intended to displace the pneumatic inner tubes now almost universally used.

The present trend in automobile vehicle wheels is very markedly toward the use of smaller wheel centers with low pressure pneumatic tires of great radial depth. The small diameter of the wheel center and the deep drop which occurs if the tire blows out is calculated to cause very serious accidents, particularly if the blow-out occurs at high speed.

Reduction in the size of the wheel center and the enlarged volume within the tire are each favorable to the development of a metallic spring insert of commercially desirable form which might take the place of pneumatic tubes.

The present invention is directed to a metallic spring structure of this type, which is of simple form and which can be adjusted as a unit to distend the tire casing and maintain it locked upon the rim against all the stresses which are encountered in practical service.

Generally stated, the invention contemplates the use of two annuli which are received between the beads of the casing and which are displaceable relatively to each other in a circumferential direction. In order to facilitate insertion into the casing it is desirable to construct the two annuli in arcuate sections, and such a construction is illustrated in the present case. The spring elements comprise bowed plate-like springs which are pivoted or hinged at their opposite ends to respective annuli, and when the spring structure is first inserted in the tire the two annuli are so displaced circumferentially with reference to each other that the bowed spring elements assume a spiral configuration. After the spring structure is inserted in the tire the two annuli are shifted circumferentially with reference to one another to displace the bowed springs from the spiral configuration just mentioned toward but not necessarily completely to a generally circular configuration. The effect of this displacement is to expand the bows and distend the tire casing very much as it would be distended by the inflation of the pneumatic inner tubes customarily used.

The adoption of a structure of this type has a number of practical advantages. The various sections of the spring structure are inserted in the casing before it is mounted on the rim. At the time of such insertion the bowed elements are in the spiral arrangement just mentioned. After the spring structure is in place, with the annuli positioned between the beads of the casing, the casing is mounted on the rim. The rim has one demountable flange. This demountable flange is fixed in place by means of bolts or other appropriate means and after the rim is set up the two annuli are shifted circumferentially by any suitable means, preferably a key, which takes the form of a small toothed pinion engaging opposed racks formed on the two annuli. The stem of this key extends through an opening provided for it in the rim. The displacement of the annuli is effected by rotating the key.

To facilitate assembly of the spring structure the two annuli are held in juxtaposition by a channel shaped clip which embraces the inner margins of the two annuli. While this clip might be in one piece, I prefer to construct it in a plurality of sections assembled end to end, because the multi-sectioned construction permits easy assembly, though the operative character of the channel when in place is the same whether it be formed in one or more sections. This channel is so formed as to isolate the annuli from the bead strips of the casing and thus minimize wear.

The invention will now be described in connection with the accompanying drawing, in which,—

Fig. 1 is a fragmentary view of the tire and rim with the spring structure in place, the plane of section being normal to the axis of the wheel, and on the median plane of the tire.

Fig. 2 is a view showing the annuli in place on the rim, with the casing sectioned on a plane passing through the axis of the wheel. In this view the bow-springs forward of the plane of section are omitted.

Fig. 3 is a fragmentary view showing a portion of the rim and the shiftable clip which locks the pinion in its adjusted position.

Fig. 4 is a section through the tire on a plane passing through the axis of the wheel.

Fig. 5 is a face view of one of the bow-spring elements.

Fig. 6 is a fragmentary perspective on an enlarged scale showing the configuration of the end portion of a spring element.

Fig. 7 is a perspective view of one of the channel members which hold the annuli in juxtaposition with each other.

Referring first particularly to Figs. 1, 2, and 4, the rim comprises a main portion 11 having a bead-engaging flange 12 formed integrally therewith, and a detachable portion 13 bolted to the main portion 11 by a series of bolts, one of which is indicated at 14 in Fig. 4. The detachable section 13 is provided with a bead-engaging flange 15 similar to the flange 12. The casing or shoe may be of any suitable construction, and ordinarily would be composed of rubber with the usual cord reinforcement. No attempt has been made to indicate the cord construction as this is not a feature of the invention. The tread of the casing is indicated at 16 and the beads at 17. Each bead is provided with the usual reinforcing ring 18, these rings being substantially inextensible and being relied upon to hold the bead snugly upon the rim.

The two annuli are made up of a plurality of mating sections 21 and 22 which are shown as entering into flat facewise engagement and which are provided each with projecting lugs 23 and 24 which work in motion-limiting slots in the opposite section. The purpose of these lugs is to limit the circumferential displacement of the two rings made up respectively of the sections 21 and 22, the sections being arcuate and being arranged end to end. At least one section 21 and at least one section 22 opposed thereto, is provided with rack teeth 25 and 26 which are formed in the bottom of recesses and which receive between them a toothed pinion 27. This pinion 27 is fixed on a stem 28 which extends through a radial bearing formed in the main portion 11 of the rim. The inner end of the stem is squared as indicated at 29 in Fig. 3, and is locked against rotation by a forked clip 31 which engages a portion of the squared end 29 and which is held against rotation and against longitudinal motion by a screw 32. The screw 32 passes through a slot 33 which permits withdrawal of the clip upon release of the screw so that the stem 28 may be turned with a wrench. After it has been turned to its finally adjusted position the clip is shifted to engage the squared end 29 and lock the stem against retrograde rotation, after which the screw 32 is set up.

The two annnuli, made up of the sections 21 and 22, respectively, are held in juxtaposed relation by channel-shaped clip elements 34 which straddle flanges formed on the inner margin of the annuli and which have beads or bosses 35 mating with grooves in the annuli so that the clips may be snapped to position and thereafter retain themselves. Flaring flanges 36 are provided to protect the tire casing from undesirable contact with the end portions of the bowed-springs about to be described. These bowed-springs are best shown in Figs. 5 and 6, and each comprises a plurality of rods or bars 37, which are rounded in cross section, as indicated in Fig. 6, and which are struck out of a single plate of sheet material. The ends of the bars 37 are connected by a disk-like boss 38, at each end of the spring, the boss 38 serving as a rocking bearing, and being provided with an aperture 39 for receiving a smaller pin or lug which retains the corresponding spring during assembly. The bosses 38 engage arcuate countersinks having undercut edges formed in the margin of the ring sections, the apertures 39 receiving loosely fitting retaining lugs 41 which are integral with the annuli. The rounded bosses turn in the undercuts, and the lugs 41 merely serve to prevent withdrawal of the spring ends. They do not receive the thrust of the springs.

It follows that the spring structure is made up of a plurality of sections each comprising a section 21 and a section 22 to which, respectively, are pivoted the opposite ends of a series of spring elements. These sections are inserted in end to end relation in the casing with the sections 21 and 22 so displaced that the springs assume a spiral configuration.

The next step is to mount the clip sections 34 in place by snapping them over the flanges on the ring sections. The tire casing with the inserted spring structure is then mounted on the rim section 11 with the pinion 27 in place and the stem 28 projecting through the bearing in the rim section 11. The detachable section 13 is then bolted in place, after which the stem 28 is turned to displace the two annuli circumferentially until the springs are brought from their spiral arrangement to the approximately circular arrangement already described. The effect of this is to expand each spring within the casing and distend the casing. The clip 31 is then brought into locking position and the screw 32 is tightened up. The tire is then ready for use.

The basic concept of the invention is the use of bowed-springs which are shifted from a spiral relationship to an approximately circular relationship to expand the bows and distend the enclosing casing. Obviously this broad idea can be incorporated in a number of specifically different structures by the exercise of mechanical skill. The construction of the annuli in sections appears to be the simplest mode of permitting ready assembly of the spring structure within the conventional casing and is adopted for that reason. The use of the small toothed pinion as a ring displacing means is based on similar considerations. The possibility of using other mechanisms is recognized.

Various expedients may be adopted to reduce the friction between the annuli 21, 22 and between these and the channel sections 34, if desired, but in the interest of simplicity no attempt is made to illustrate such features.

What is claimed is,—

1. The combination of a tire casing of the type used with pneumatic tires, said casing having beads; a rim on which said casing is mounted, said rim confining said beads; two circumferentially shiftable annuli concentric with the casing and held in juxtaposition between said beads; a plurality of bowed plate-like spring elements hinged at their opposite ends to respective annuli and so dimensioned that circumferential shifting of the annuli carries the bowed elements from a spiral toward a circular configuration and causes them to expand and distend the casing; and means for so shifting said annuli.

2. The combination of a tire casing of the type used with pneumatic tires, said casing having beads; a rim on which said casing is mounted, said rim confining said beads; two circumferentially shiftable annuli concentric with the casing and held in juxtaposition between said beads; a plurality of bowed plate-like spring elements hinged at their opposite ends to respective annuli and so dimensioned that circumferential shifting of the annuli carries the bowed elements from a spiral toward a circular configuration and causes them to expand and distend the casing; a pinion in toothed engagement with said annuli and rotatable to shift the same circumferentially; and means for locking said pinion in adjusted positions.

3. The combination of a tire casing of the type used with pneumatic tires, said casing having beads; a rim supporting and confining said bead; two annuli relatively shiftable circumferentially, said annuli being composed of separable arcuate sections; channeled clip means for engaging portions of said annuli to hold the annuli in juxtaposition, said clip means entering between the beads; a plurality of bowed plate-like spring elements hinged at their opposite ends to respective annuli and so dimensioned and arranged that circumferential shifting of the annuli carries the bowed elements from a spiral toward a circular configuration and thus causes them to expand and distend the casing; and means reacting between the annuli to shift the same.

4. The combination of a tire casing of the type used with pneumatic tires, said casing having beads; a rim supporting and confining said bead; two annuli relatively shiftable circumferentially, said annuli being composed of separable arcuate sections; channeled clip means composed of a plurality of arcuate sections for engaging portions of said annuli to hold the annuli in juxtaposition; a plurality of bowed plate-like spring elements hinged at their opposite ends to respective annuli and so dimensioned and arranged that circumferential shifting of the annuli carries the bowed elements from a spiral toward a circular configuration and thus causes them to expand and distend the casing; and means reacting between the annuli to shift the same.

5. The combination defined in claim 3 in which the clip means is provided with flange-like portions which extend between the beads and said annuli to protect the beads from wear.

6. The combination defined in claim 1 in which the bowed plate-like spring elements are each composed of a plurality of integrally formed spaced bars of rounded cross section.

7. The combination defined in claim 3 in which the clip means are provided with beads which engage recesses in the annuli and thus retain the clip means in position on the annuli.

ROBERT LEE DURHAM.